Patented Feb. 13, 1951

2,541,015

UNITED STATES PATENT OFFICE 2,541,015

PREPARATION OF HYDROXY CYCLAM-
MONIUM QUATERNARY SALTS

Earl J. Van Lare and Leslie G. S. Brooker, Rochester, N. Y., assignors to Eastman Kodak Company, Rochester, N. Y., a corporation of New Jersey No Drawing. Application April 3, 1948,
Serial No. 18,845

6 Claims. (Cl. 260—304)

This invention relates to hydroxy cyclammonium quaternary salts and to a process for the preparation thereof.

2-methyl-6-hydroxybenzothiazole is known, having been described by Fries and Buchler, Ann. 454, 242 (1927). This hydroxy base can be quaternized by heating with dimethyl sulfate. However, the quaternary salt thus obtained is contaminated with 6 - methoxybenzothiazole quaternary salt, owing to methylation of the hydroxyl group by the dimethyl sulfate. 6-hydroxybenzoxazole methomethylsulfate has been employed in the preparation of a carbocyanine dye by condensation with triethylorthoformate, in the presence of triethylamine. However, yields of hydroxy cyanine dyes prepared from hydroxy cyclammonium quaternary salts which are prepared by heating a hydroxy heterocyclic nitrogen base with an alkyl salt, are minimal.

Kiprianov, Ushenko and Sych, J. Gen. Chem. U. S. S. R. 15, 200–206 (1945) showed that 6-methoxy-2-methylbenzothiazole could be hydrolyzed with concentrated hydrobromic or hydrochloric acid to give 6-hydroxy-2-methylbenzothiazole hydrobromide or hydrochloride. They showed that when 6-methoxy-2-methylbenzothiazole ethobromide was hydrolyzed with hydrobromic acid, not only was the methoxyl group hydrolyzed, but splitting out of alkyl halide took place, so that the 6-hydroxy-2-methylbenzothiazole quaternary salt could not be obtained by such method. To obtain the quaternary salt of 6-hydroxy-2-methylbenzothiazole, Kiprianov et al. were forced to resort to treating the hydrochloride of 6-hydroxy-2-methylbenzothiazole with ethyl p-toluenesulfonate which tends to contaminate the hydroxy quaternary salt owing to methylation of the hydroxyl group, as discussed above in connection with heating 6-hydroxy-2-methylbenzothiazole with dimethyl sulfate to form the quaternary salt.

We have now found that unlike the ethobromide of 6-methoxy-2-methylbenzothiazole, the ethiodide and other alkiodides of 6-methoxy-2-methylbenzothiazole can be hydrolyzed, in hydrobromic acid, to give the 6-hydroxy-2-methylbenzothiazole quaternary salt, without the splitting out of alkyl halide. Thus, pure 6-hydroxy-2-methylbenzothiazole quaternary salts free from contaminating alkoxyl derivatives can be obtained. Not only can 6-methoxy-2-methylbenzothiazole alkiodides be so hydrolyzed, but other alkoxy-2-methylbenzothiazole alkiodides and alkoxy-2-methylbenzoxazole alkiodides be so hydrolyzed to give pure hydroxy-2-methylbenzothiazole and 2 - hydroxy - methylbenzoxazole quaternary salts. The alkobromide is obtained as the hydrolysis product and this can be converted to the alkiodide which, in turn, can be converted to the alkochloride.

It is, accordingly, an object of our invention to provide new hydroxy cyclammonium alkohalides. A further object is to provide a process for preparing hydroxy cyclammonium quaternary salts free from contaminating alkoxy cyclammonium quaternary salts. A still further object is to provide new hydroxy dyes free from contaminating alkoxy dyes. Still further objects will become apparent hereinafter.

In accordance with our invention, we provide hydroxy cyclammonium quaternary salts which are free from contaminating alkoxy cyclammonium quaternary salts by hydrolyzing, in hydrobromic acid, an alkoxy cyclammonium alkiodide selected from those represented by the following general formula:

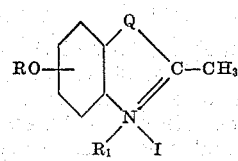

wherein Q represents an atom selected from the group consisting of an oxygen atom, a sulfur atom and a selenium atom, R represents an alkyl group, e. g. methyl, ethyl, n-propyl, isopropyl, n-butyl, isobutyl, etc., and $R_1$ represents an alkyl group, especially a primary alkyl group, e. g. methyl, ethyl, n-propyl, n-butyl, isobutyl, etc.

The hydrobromic acid employed advantageously contains from 35 to 48 per cent by weight of hydrogen bromide, the remainder, of course, being water. Constant boiling hydrobromic acid, i. e. the 48 per cent, is most advantageously employed. The hydrolysis is carried out most advantageously by refluxing the mixture of hydrobromic acid and alkoxy cyclammonium alkiodide. However, higher or lower temperatures can be used, e. g. temperatures from 80° to 150° C.

The hydrolysis product is a hydroxy cyclammonium alkobromide and this is advantageously converted to the hydroxy cyclammonium alkiodide by treating a solution of the hydrolysis product with an aqueous or alcoholic solution of a water-soluble metal iodide, e. g. an alkali metal iodide, e. g. sodium or potassium iodide. The hydroxy cyclammonium alkiodide can be converted to the hydroxy cyclammonium alkochloride by heating the hydroxy cyclammonium alkiodide with a suspension of silver chloride in methyl alcohol, or with a suspension of silver chloride in a phenol, according to the process described in United States Patent 2,245,249, dated June 10, 1941. The alkobromide can be regenerated from the alkochloride by treating a solution of the alkochloride with a concentrated aqueous solution of sodium or potassium bromide.

The following examples will serve to illustrate further the manner of practicing our invention.

*Example 1.—5-hydroxy-2-methylbenzoxazole methiodide*

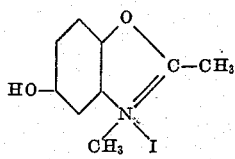

49.4 g. of 5-methoxybenzoxazole ethiodide were refluxed for three hours with 75 cc. 48 per cent hydrobromic acid. The brown solution was chilled and the solid which separated was filtered off. It was dissolved in 200 cc. of ethyl alcohol and to the hot solution was added a solution of 33.8 g. sodium iodide in a minimum of ethyl alcohol. The resulting solution was cooled, the solid was filtered off. It was washed with a small amount of cold ethyl alcohol and dried. A yield of 35.2 g., 74 per cent, was obtained. Melting point 257–60° C. with decomposition-tan crystals.

*Example 2.—6-hydroxy-2-methylbenzothiazole methiodide*

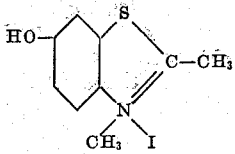

21.7 g. of 6-methoxy-2-methyl benzothiazole methiodide and 34 cc. of 48 per cent hydrobromic acid were mixed in a 200 cc. flask and refluxed 2½ hours. The solution was chilled to 0° C. and filtered. The solid was washed with a small amount of acetone. It was dissolved in ethyl alcohol and treated in the hot with a solution of 15 grams of sodium iodide in ethyl alcohol. The solution was chilled to 0° C. and the solid filtered off and dried. A yield of 11.6 grams of colorless solid was obtained of melting point 267° C. with decomposition.

*Example 3.—6-hydroxy-2-methylbenzothiazole ethiodide*

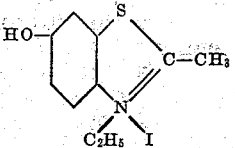

33.5 grams of 6-methoxy-2-methylbenzothiazole ethiodide and 50 cc. of 48 per cent hydrobromic acid were mixed in a 200 cc. flask and refluxed 1½ hours. The reaction mixture was chilled to 0° C. and the separated solid was filtered as dry as possible. The solid was dissolved in 900 cc. of methyl alcohol and treated with a solution of 15 grams of sodium iodide in 100 cc. of methyl alcohol. The solution was chilled to 0° C., the separated solid was filtered off and washed with methyl alcohol. A yield of 20.7 grams of colorless solid was obtained of melting point 275° C. with decomposition.

*Example 4.—5-hydroxy-2-methylbenzothiazole methiodide*

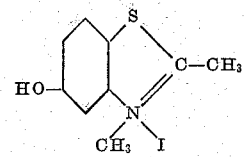

22.5 grams of 5-methoxy-2-methylbenzothiazole methiodide were dissolved in 35 cc. of 48 per cent hydrobromic acid and the solution was refluxed 1½ hours. The clear solution was chilled in a refrigerator whereupon solid separated. The solid was filtered off and dissolved in ethyl alcohol. The solution was treated with a saturated hot solution of 13.5 grams of sodium iodide (1 mol. + 30 per cent excess) in ethyl alcohol. The solution was chilled and the solid was filtered off and washed with a small amount of ethyl alcohol. A yield of 13.4 grams, 62 per cent, was obtained of melting point 253–6° C. with decomposition.

*Example 5.—5-hydroxy-2-methylbenzothiazole ethiodide*

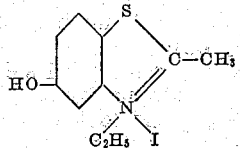

33.5 grams of 5-methoxy-2-methylbenzothiazole ethiodide were dissolved in 50 cc. of 48 per cent hydrobromic acid and the resulting solution was refluxed for 2 hours. The solution was chilled in a refrigerator. The solid which separated was filtered off and dissolved in ethyl alcohol. The hot solution was treated with a hot saturated solution of 15 grams (1 mol.) of sodium iodide in ethyl alcohol. The solution was cooled. The solid was filtered off and washed with a small amount of ethyl alcohol. A yield of 24.6 grams, 76 per cent, was obtained of melting point 205–7° C. with decomposition.

In a manner similar to that illustrated in the foregoing examples, 5-methoxy-2-methylbenzothiazole n-butiodide can be hydrolyzed to give 5-hydroxy-2-m thylbenzothiazole n-butiodide, 6-methoxy-2-methylbenzothiazole n-propiodide can be hydrolyzed to give 6-hydroxy-2-methylbenzothiazole n-propiodide, 4-methoxy-2-methylbenzothiazole ethiodide can be hydrolyzed to give 4-hydroxy-2-methylbenzothiazole ethiodide, 4-methoxy-2-methylbenzoxazole ethiodide can be hydrolyzed to give 4-hydroxy-2-methylbenzoxazole ethiodide, 5-n-butoxy-2-methylbenzothiazole ethiodide can be hydrolyzed to give 5-hydroxy-2-methylbenzothiazole ethiodide, 5-methoxy-2-methylbenzoselenazole ethiodide can be hydrolyzed to give 5-hydroxy-2-methylbenzoselenazole ethiodide, etc.

The alkoxy cyclammonium quaternary salts employed in our new process can be prepared by heating the corresponding alkoxy heterocyclic nitrogen base with the alkyl iodide, e. g. methyl iodide, ethyl iodide, n-propyl iodide, n-butyl iodide, isobutyl iodide, etc., using a closed tube for the heating where higher temperatures are desired or volatility of the reactants demands.

The alkoxy heterocyclic nitrogen bases themselves, from which the alkiodides can be prepared, are known for the most part. The alkoxy-2-methylbenzothiazole bases can be prepared by the method of Fries et al., Ann. 407, 208 (1915) in which the appropriate thioacetylalkoxyaniline is oxidized with alkaline potassium ferricyanide. Thus p-methoxyaniline (p-anisidine) gives 6-methoxy-2-methylbenzothiazole. The thioacetylalkoxyanilines can be prepared by treating the corresponding acetylalkoxyaniline with phosphorus pentasulfide. The acetylalkoxyanilines can be prepared by the action of acetic anhydride or acetyl chloride on the corresponding alkoxyaniline compound. Several of the alkoxy-2-methylbenzothiazole bases can also be prepared by reducing (o-nitrophenyl) disulfides with zinc dust and acetic acid, acetylating the reduction mixture with acetic anhydride and closing the ring by heating the resulting mixture. The bis (o-nitrophenyl)-disulfides can be prepared from the corresponding 1-bromo-2-nitroalkoxybenzenes by heating the 1-bromo-2-nitroalkoxybenzene with sodium disulfide in methyl alcohol. Thus 2-bromo-5-methoxynitrobenzene gives bis (4-methoxy-2-nitrophenyl) disulfide which, on reduction and acetylation of the reduction product and closing the ring by heating the resulting mixture, gives 5-methoxy-2-methylbenzothiazole.

The alkoxy-2-methylbenzoxazoles can be prepared by treating the appropriate alkoxy-o-aminophenol with an excess of acetic anhydride, distilling off the acetic acid generated in the reaction as it is formed. Thus 2-hydroxy-4-methoxyaniline and acetic anhydride gives 6-methoxy-2-methylbenzoxazole, etc.

The alkoxy-2-methylbenzoselenazole bases can be prepared by reducing (o-nitrophenyl) diselenides with zinc dust and acetic acid, acetylating the reduction mixture with acetic anhydride and closing the ring by heating the resulting mixture. The bis (o-nitrophenyl) diselenides can be prepared from the corresponding 1-bromo-2-nitroalkoxybenzenes by heating the 1-bromo-2-nitroalkoxybenzenes with sodium diselenide in methyl alcohol. Thus, 2-bromo-5-methoxynitrobenzene gives bis (4-methoxy-2-nitrophenyl) diselenide which, on reduction and acetylation of the reduction product and closing the ring by heating the resulting mixture, gives 5-methoxy-2-methylbenzoselenazole. See also Clark, J. Chem. Soc. (London), 1928, 2313, for the general method.

The hydroxy cyclammonium alkohalides of our invention can be employed to prepare cyanine, styryl and merocyanine dyes. Thus, the hydroxy cyclammonium alkohalides can be condensed with cyclammonium alkyl quaternary salts containing an iodine atom or a thioether group in a reactive position (i. e. the $\alpha$- or $\gamma$-position) to give monomethine cyanine dyes containing a hydroxyl group. The condensations are advantageously effected in the presence of a basic condensing agent, e. g. a tertiary amine e. g. a trialkylamine, such as triethylamine, tri-n-propylmine, triisoamylamine, N-methylpiperidine, N-ethylpiperidine, etc. Typical cyclammonium alkyl quaternary salts containing an iodine atom or thioether group are: 2-iodoquinoline ethiodide, 2-iodoquinoline n-butiodide, 2-methylmercaptobenzothiazole metho-p-toluenesulfonate, 2-methylbenzoxazole etho-p-toluenesulfonate, 2-methylmercapto-$\beta$-naphthothiazole etho-p-toluenesulfonate, etc.

The hydroxy cyclammonium alkohalides can be condensed with alkyl orthocarboxylates, e. g. ethyl orthoformate, ethyl orthoacetate, ethyl orthopropionate, methyl orthoformate, etc., in pyridine, to give symmetrical carbocyanine dyes.

The hydroxy cyclammonium alkohalides can be condensed with cyclammonium quaternary salts containing, in a reactive position, a $\beta$-arylaminovinyl or a $\beta$-acylated arylaminovinyl group to give unsymmetrical carbocyanine dyes. The condensations are advantageously effected in the presence of a basic condensing agent, e. g. the tertiary amines set forth above. Typical cyclammonium quaternary salts containing a $\beta$-arylaminovinyl or $\beta$-acylated arylaminovinyl group are: $\beta$-acetanilidovinylbenzoxazole ethiodide, $\beta$-anilinovinylthiazoline methiodide, $\beta$-acetanilidovinylbenzothiazole ethiodide, 4-($\beta$-anilinovinyl)-quinoline n-butiodide, 2-[2-(N-methylanilino)-vinyl]benzothiazole ethiodide, 2-$\beta$-acetanilidovinyl-4-methylthiazole ethiodide, etc.

The hydroxycyclammonium alkohalides can be condensed with $\beta$-anilinoacrolein anil hydrochloride or with glutaconic dianilide hydrochloride, in the presence of a basic condensing agent, e. g. a tertiary amine, e. g. those set forth above, to give di- and tricarbocyanine dyes.

The hydroxy cyclammonium alkohalides can be condensed with heterocyclic compounds containing a ketomethylene group ($-CH_2-CO-$) and alkyl orthocarboxylates, e. g. ethyl orthoformate, ethyl orthoacetate, ethyl orthopropionate, etc., in the presence of pyridine, to give mercarbocyanine dyes. Typical ketomethylene compounds include rhodanine, 3-ethylrhodanine, 3-$\beta$-hydroxyethylrhodanine, 3-phenylrhodanine, 3-ethyl-2-thio-2,4-(3,5)-oxazoledione, 1-methyl-3-phenyl-5-pyrazolone, 3-$\beta$-carboxyethylrhodanine, 3-p-carboxyphenylrhodanine, 3-carboxymethyl-2-thio-2,4-(3,5)-oxazoledione, 1-methyl-3-p-sulfophenyl-5-pyrazolone, 1,3-diphenyl-2-thiohydantoin, 1-ethyl-3-phenyl-2-thiohydantoin, 1-carboxymethyl-3-phenyl-2-thiohydantoin, 3-$\beta$-sulfoethylrhodanine, etc.

The hydroxy cyclammonium alkohalides can be condensed with heterocyclic compounds containing, substituted on the methylene group, an acylated arylaminomethylene group, e. g. 5-acetanilidomethylenerhodanines, 5-acetanilidomethylene-2-thiohydantoins, 5-acetanilidomethylene-2-thio-2,4(3,5)-oxazolediones, etc., in the presence of a basic condensing agent, e. g. the tertiary amines set forth above.

The hydroxy cyclammonium alkohalides can be condensed with dialkylaminobenzaldehydes, e. g. p-dimethylaminobenzaldehyde, p-diethylaminobenzaldehyde, etc. to give styryl dyes. The condensations are advantageously carried out in the presence of a secondary amine, e. g. piperidine, methylpiperidines, etc.

The hydroxy cyclammonium alkohalides can be condensed with pyrrole carboxaldehydes to give pyrrolocarbocyanine dyes. The condensations are advantageously carried out in a solvent, e. g. methyl, ethyl, n-propyl, isopropyl, isobutyl or n-butyl alcohol. Pyrrole carboxaldehydes can be prepared by the method of Nenitzescu and Isacescu, Bull. soc. chim. Romania 11, 135 (1929). See also Brooker and Sprague, J. Am. Chem. Soc. 67, 1869 (1945).

The hereindescribed cyanine, merocyanine and styryl dyes sensitize photographic silver halide emulsions, especially the customarily employed gelatino-silver-chloride, chlorobromide, chlorobromoiodide, bromide and bromoiodide emulsions, when incorporated therein, e. g. in a concentration of from 10 to 40 mg. per liter of emulsion. The dyes can be added to the emulsions from their solutions in methyl alcohol. The pyrrolocyanine dyes described herein can be employed for the preparation of overcoating layers, filter layers and anti-halation layers for photographic elements.

Among the dyes that have been prepared from the hereindescribed hydroxy cyclammonium quaternary salts are:

6,6'-dihydroxy - 3,3' - dimethylthiacarbocyanine iodide, fine dark green crystals, M. P. 331–332° C. with decomposition.
3,3'-diethyl-3,3' - dihydroxythiacarbocyanine iodide, dark blue-green needles, M. P. 294–295° C. with decomposition.
9-ethyl-6,6' - dihydroxy - 3,3' - dimethylthiacarbocyanine iodide, fine red needles, M. P. 307–308° C. with decomposition.
5,5' - dihydroxy - 3,3' - dimethylthiacarbocyanine iodide, M. P. 316–317° C. with decomposition.
3,3' - diethyl - 5,5' - dihydroxythiacarbocyanine iodide, very dark needles, M. P. 333–334° C. with decomposition.
3,3'-diethyl - 5,5' - dihydroxy - 9 - methylthiacarbocyanine iodide, blue crystals, M. P. 313–314° C. with decomposition.
3,3'-diethyl - 5,5' - dihydroxythiatricarbocyanine iodide, fine, very dark crystals, M. P. 249–251° C. with decomposition.
3,3' - diethyl - 5' - hydroxyoxathiacarbocyanine iodide, steel blue needles, M. P. 293–294° C. with decomposition.
3-ethyl - 5 - [(3 - ethyl - 5 - hydroxy-2(3)-benzothiazolylidene)isopropylidene] - 2 - thio - 2,4-(3,5)-oxazoledione, fine red needles, M. P. 273 to 274° C. with decomposition.
5 - [(3 - ethyl - 5 - hydroxybenzothiazolylidene)-ethylidene]-3-ethylrhodanine, greenish crystals with a bright reflex, M. P. 304 to 305° C. with decomposition.
1'-ethyl - 5 - hydroxy - 3 - methylthia-2'-cyanine iodide, green crystals, M. P. 271–273° C. with decomposition.
2-p-dimethylaminostyryl - 5 - hydroxybenzothiazole ethiodide, M. P. 295–296° C. with decomposition.
3-ethyl-5-hydroxy - 2',5' - dimethyl - 1' - phenyloxapyrrolocarbocyanine iodide, M. P. 273 to 274° C. with decomposition.

What we claim as our invention and desire to be secured by Letters Patent of the United States is:

1. A process for preparing a hydroxy cyclammonium quaternary salt comprising hydrolyzing at a temperature of from 80° to 150° C., in the presence of hydrobromic acid, an alkoxy cyclammonium alkiodide selected from the group consisting of those represented by the following general formula:

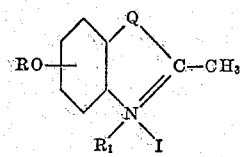

wherein Q represents an atom selected from the group consisting of an oxygen atom, a sulfur atom and a selenium atom, and R and $R_1$ each represents an alkyl group.

2. A process for preparing a hydroxybenzothiazole quaternary salt comprising hydrolyzing at a temperature of from 80° to 150° C., in the presence of hydrobromic acid, an alkoxybenzothiazole alkiodide selected from the group consisting of those represented by the following general formula:

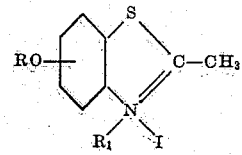

wherein R represents an alkyl group of the formula $C_nH_{2n+1}$ wherein n represents a positive integer of from 1 to 2 and $R_1$ represents a primary alkyl group containing from 1 to 4 carbon atoms.

3. A process for preparing a hydroxybenzothiazole quaternary salt comprising hydrolyzing at a temperature of from 80° to 150° C., in the presence of constant boiling hydrobromic acid, an alkoxybenzothiazole alkiodide selected from the group consisting of those represented by the following general formula:

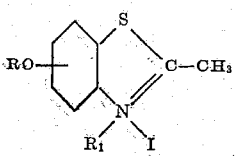

wherein R represents an alkyl group of the formula $C_nH_{2n+1}$ wherein n represents a positive integer of from 1 to 2 and $R_1$ represents a primary alkyl group containing from 1 to 4 carbon atoms.

4. A process for preparing a hydroxybenzothiazole quaternary salt comprising hydrolyzing at a temperature of from 80° to 150° C., in the presence of constant boiling hydrobromic acid, 5-methoxy-2-methylbenzothiazole ethiodide.

5. A process for preparing a hydroxybenzothiazole quaternary salt comprising hydrolyzing at a temperature of from 80° to 150° C., in the presence of constant boiling hydrobromic acid, 6-methoxy-2-methylbenzothiazole ethiodide.

6. A process for preparing a hydroxybenzoxazole quaternary salt comprising hydrolyzing at a temperature of from 80° to 150° C., in the presence of constant boiling hydrobromic acid, 5-methoxy-2-methylbenzoxazole ethiodide.

EARL J. VAN LARE.
LESLIE G. S. BROOKER.

REFERENCES CITED

The following references are of record in the file of this patent:

UNITED STATES PATENTS

| Number | Name | Date |
|---|---|---|
| 2,332,517 | Kendall | Oct. 26, 1943 |

OTHER REFERENCES

Chemical Abstracts, vol. 40, pp. 2307–2309 citing Kiprianov, Jr. Gen. Chem. (USSR), vol. 15, pp. 200–206.